May 26, 1925.

J. T. JANETTE

ELECTRIC MOTOR

Filed Nov. 9, 1921

1,539,571

Witness:
W. K. Olson

Inventor:
John T. Janette
By Glenn S. Noble Atty.

Patented May 26, 1925.

1,539,571

UNITED STATES PATENT OFFICE.

JOHN T. JANETTE, OF CHICAGO, ILLINOIS.

ELECTRIC MOTOR.

Application filed November 9, 1921. Serial No. 513,881.

*To all whom it may concern:*

Be it known that I, JOHN T. JANETTE, a citizen of the United States, residing at Chicago, in the county of Cook and State of Illinois, have invented certain new and useful Improvements in Electric Motors, of which the following is a specification.

This invention relates more particularly to means for short circuiting the commutator bars of a repulsion-induction motor. In alternating current motors of this type it is desirable to have the motor start as a repulsion motor with the current passing through the commutator and then to short circuit the commutator bars so that after the motor has attained a predetermined speed it will operate as an induction motor.

The objects of the present invention are to provide an improved motor of this character having a novel short circuiting device; to provide a short circuiting device which is of simple construction and not liable to get out of order and one in which a wiping contact is made in order to keep the contacts clean; to provide a motor of this character with a plurality of contact members all of which coact under centrifugal force in order to make contact with the commutator bars; and in general to provide such an improved short circuiting construction as will be described more fully hereinafter.

In the accompanying drawings illustrating a preferred form of this invention—

Figure 1:
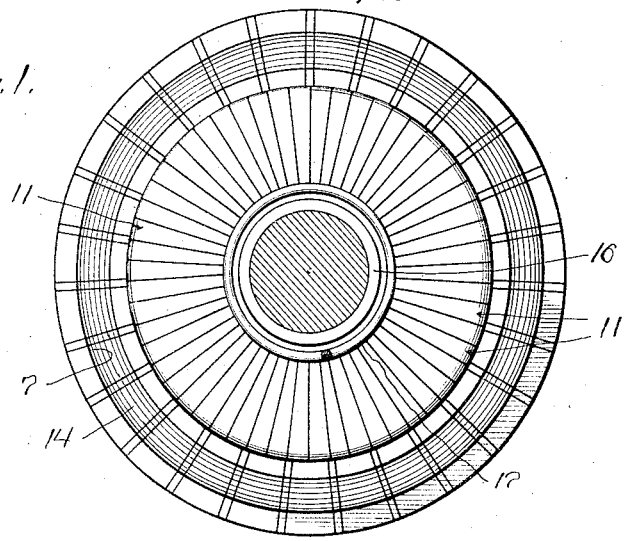
Figure 1 is an end view of the short circuiting mechanism with parts shown in section as taken on the line 1—1 of Figure 2.

As shown in these drawings the armature shaft 5 is provided with a commutator hub 6 which may be secured thereto in any suitable manner. The armature is omitted from the drawings as it does not form any specific part of the present invention and such amatures are of well-known construction. The hub 6 carries the commutator bars 7 which are mounted thereon in any suitable manner and are of course insulated from the hub. This hub is provided with an annular recess 8 at its outer end and adjacent to the shaft 5. This recess has an inwardly extending ledge or annular projection 9 so that the outer portion of the recess forms a groove 10. A plurality of switch members or contacts 11 are mounted in the recess 8 and extend outwardly to make contact at times with the commutator bars 7. Each contact 11 comprises a head 12 which extends from the bottom of the groove 10 to the shaft 5 and a curved arm 13 which is preferably somewhat wider at its outer end than at its inner end and which is adapted to make contact with the beveled contact face 14 of the commutator bars. The contacts or switch members 11 are also preferably tapered or made somewhat wedge shaped as shown in Figure 1 so that they will make a substantially continuous ring around the shaft. The outer portions 15 of the contact heads 12, which fit in the grooves 10 are somewhat narrower than the grooves so that the heads may move longitudinally with respect to the shaft 5.

The inner ends of the heads 12 are all engaged by a sleeve 16 which fits loosely on the shaft 5 and is pressed against the heads by means of a spring 17. The outer end of the spring may engage with any suitable abutment such as a cap or cover plate 19 which is held in position by a split ring 20 or other suitable fastening.

Figure 2:
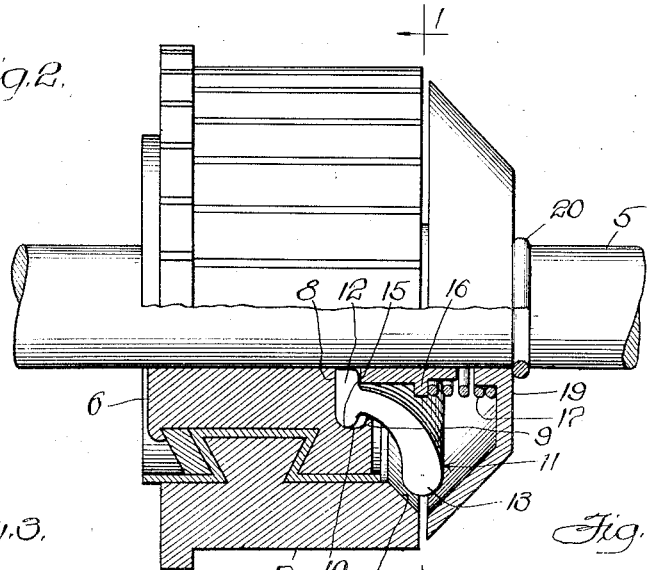
Figure 2 is a side view of the commutator and short circuiting device with parts shown in section.
Figure 3:
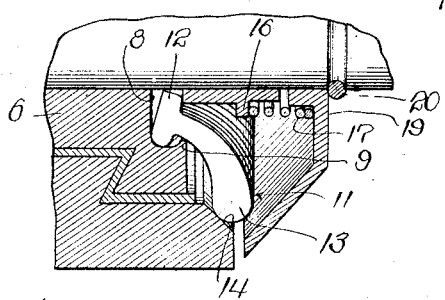
Figure 3 is a detail showing the first movement of the switch or contact members.
Figure 4:
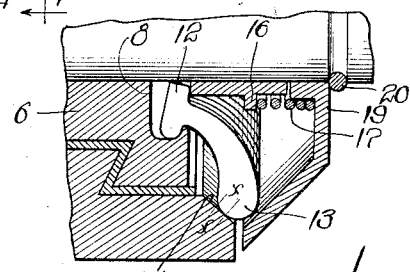
Figure 4 is a similar view showing the position of the switch or contact members after the motor has attained running speed.

The operation of the short circuiting device will be readily understood from a study of Figures 2, 3 and 4. When the armature is at rest, the sleeve 16 pressing against the heads 12 will hold all of the contacts 11 in position shown in Figure 2 with their outer ends out of engagement with the commutator bars. When the motor is started and the armature begins to revolve, centrifugal force will tend to throw the outer ends of the contacts 11 outwardly or away from the shaft 5 until they strike the beveled contact faces 14 of the commutator bars 7 as shown in Figure 3. As soon as they strike these faces such rotating movement on the heads 12 is stopped and the further action of the centrifugal force will be to tend to move the contacts bodily so that the contact points will slide on the contact faces 14 and the contacts will assume the position shown in Figure 4. It will be seen that the final outward movement of the contacts will cause the contact points to move a distance as indicated at $x$ in Figure 4 and the heads 12 will move longitudinally on the shaft to the position shown in this figure. During this movement the spring 17 is compressed as the contacts force the sleeve 16 outwardly.

When the motor is stopped, the reverse action takes place, the spring first forcing the heads inwardly or to the position shown in Figure 3 when the contact points will again slide on the contact surfaces 14 and then the outer ends of the contacts will swing inwardly to the original position shown in Figure 2. The short circuiting contacts 11 may be made of any suitable thickness and the mounting of these contacts is such that they are apt to have some circumferential movement with respect to the commutator which further tends to keep the contact surfaces clean and also tends to keep the contacts in freely movable condition. The distance between the shaft and the projection 9 is such that the heads 12 may be readily inserted in position but after the sleeve 16 is placed on the shaft, it will be impossible for the contacts to become disengaged. In order to insure the locking of these contacts in position, the sleeve 16 is made of sufficient length so that it will strike the cap or shell 19 before it can be moved a sufficient distance to permit the disengagement of the contacts from the recess 8.

It will of course be apparent that the contact members may be made in different forms for different motors and the general design and arrangement of the parts may be modified for different conditions and therefore I do not wish to be limited to the exact construction herein shown and described, except as pointed out in the following claims in which I claim:

1. In a short circuiting apparatus for a repulsion-induction motor, the combination with a commutator hub having an annular recess therein, of a plurality of radially arranged contacts having heads which are slidably mounted directly in said recess, and having outwardly projecting portions with contact points adjacent to the ends of the commutator bars and adapted to engage with the ends of said bars, and resilient means tending to hold the heads in normal position in said recess with the outer ends of the contacts away from the commutator bars, the arrangement being such that said contacts will move longitudinally of the commutator and the outer ends thereof will swing outwardly to make contact when the commutator is revolved at a predetermined speed.

2. In a device of the character set forth, the combination with a commutator hub having a recess in the end thereof and with an inwardly extending projection forming a groove in the outer periphery of the recess, of a plurality of contacts each contact having a head fitting loosely in said recess and slidable in the groove and having an outwardly extending arm terminating at a point adjacent to the ends of the commutator bars, commutator bars having beveled surfaces for engagement with the ends of said contacts, a sleeve engaging with the heads of the contacts and tending to hold the heads in the recess and a spring pressing against said sleeve, the arrangement being such that the contacts will be forced outwardly under the influence of centrifugal force to make wiping contacts with the ends of the commutator bars.

3. In a repulsion-induction motor, the combination with the motor shaft, of a commutator hub on said shaft, said hub having a recess in the end thereof with an inwardly extending annular projection, a plurality of tapered contacts, each contact having a head fitting loosely in said recess and having an outwardly projecting arm, a sleeve on said shaft engaging with said heads, a spring engaging with said sleeve, an abutment for said spring, and commutator bars on said hub, said bars having beveled ends adjacent to the outer ends of said arms, the arrangement being such that the arms will be normally out of engagement with the bars but will be acted upon by centrifugal force to cause them to first engage with said beveled surfaces and then slide outwardly on said surfaces to make wiping contacts with the bars and the reverse action to occur when the motor is stopped.

JOHN T. JANETTE.